June 20, 1939.  A. LEBER  2,163,205
OPTICAL LIGHT EXPOSURE METER
Filed Nov. 20, 1936
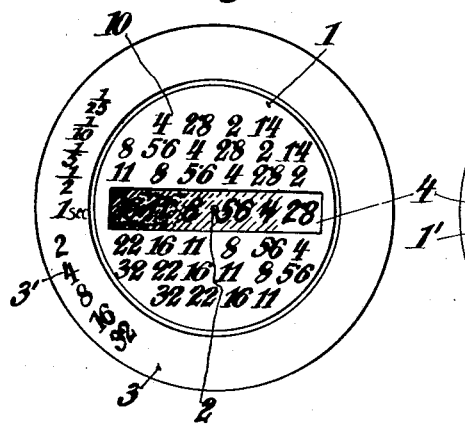
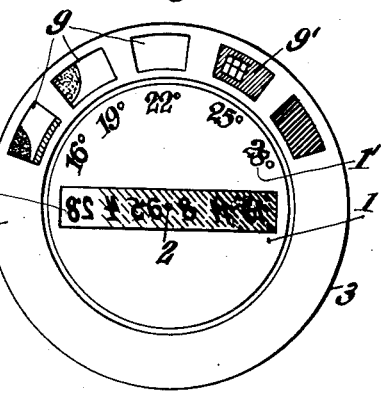
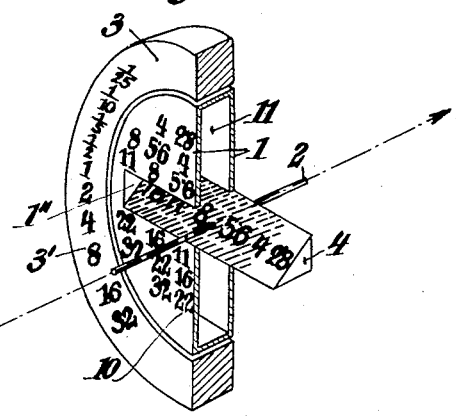

Patented June 20, 1939

2,163,205

UNITED STATES PATENT OFFICE 2,163,205

OPTICAL LIGHT EXPOSURE METER

Alois Leber, Wiener-Neustadt, Nieder-Oesterreich, Austria

Application November 20, 1936, Serial No. 111,879
In Austria November 23, 1935

2 Claims. (Cl. 88—23)

Optical exposure meters are known in which the graduated value proportional to the impinging light is read by the darkening of a sight scale. However, in the known instruments the sensitivity of the eyes which is dependent upon the brightness of the light acting on the eyes is not taken into consideration. Furthermore, these instruments are relatively difficult to read.

After the adjustment of the eye sensitivity factor and the graduated value, the present invention enables, without additional manipulation, the time of exposure to be read for a certain stop size or the size of stop for a certain exposure. This is attained by providing a grey wedge arranged obliquely to the axis of vision and bearing sight values which at the same time form part of the tables on the outer side of the instrument. The tables with the eye sensitivity factor and those with the plate sensitivity factors are relatively shiftable so that the time of exposure and size of stop can be read by adjusting these factors or values.

An embodiment of the invention is illustrated by way of example in the accompanying drawing in which:

Fig. 1 shows the instrument in front elevation,
Fig. 2 is a rear elevation of the instrument,
Fig. 3 shows the instrument partly in perspective and partly in cross section.

The instrument comprises an inner part 1 rotatable about an axle 2 and surrounded by an outer part 3. The part 1 is hollow and has a slot 1'' in its front and rear sides. A grey wedge 4 is inserted in the hollow space 11 of the part 1 in alignment with the slot 1''.

The grey wedge is a wedge or prism-shaped translucent body of dark colour, preferably grey, at one end and gradually fading away or getting lighter towards the other end, so that the intensity of light passing through the wedge is gradually weakened from the clear end towards the grey end. This edge has a scale indicating the different steps of weakening and termed "sight scale". The numbers of this sight scale represent the stop values to be set on the camera. By looking through the grey wedge a certain number is found to be just visible. Whether this number is in a dark or light step of the grey wedge will depend upon the intensity of light passing through the wedge 4.

The inner part 1 has on its rear side a scale 1' indicating the sensitivity of the different photographic plates and on its front side a plurality of vertical tables 10 each table being in alignment with one of the numerals on the grey wedge 4.

The outer part 3 bears on its rear side a number of sight symbols 9 and on its front side an exposure table 3'.

The instrument is used in the following manner:

First the plate sensitivity factor 1' (for example Scheiner degrees) marked on the rear side of the inner rotatable part 1 (Fig. 2) is brought opposite the corresponding eye sensitivity symbol 9 on the rear side of the outer part 3 of the instrument. If for example a plate of 25° Scheiner is used in the camera and the photograph is to be taken in a light room, the inner part 1 is turned until the Scheiner figure 25° registers with the symbol for light interiors. The symbol of "light interiors" is situated at the top of Fig. 2 and designated by 9'.

The instrument is then turned over so that the front side shown in Fig. 1 is viewed. The grey wedge 4 fitted in the viewing slot 1'' in part 1 of the instrument is then looked through and the object whose light intensity is to be measured is viewed. One of the sight numerals on the grey wedge will just be legible. By the turning of the inner part 1 relatively to the outer part 3 the instrument has to be set so that the numeral just legible on the grey wedge already stands in the correct relationship to the exposure time 3' on the outer part 3. The exposure value coordinated to the sight numeral just visible on the grey wedge 4 is ascertained by reading, when the viewing slot is in horizontal position (Fig. 1), the exposure value which lies in the horizontal through the axis of the instrument and consequently also in the extension of the grey wedge. As can be seen in Fig. 1, this is the exposure value of 1 second.

If, therefore, the numeral "8" (stop 8) is that which is just legible on the grey wedge 4, the setting shows, that this stop 8 is coordinated to the exposure time 1 second. However, it may be necessary to choose some other stop than 8 for known reasons. In this instance the instrument according to the invention enables this to be ascertained rapidly, the desired stop value (for example stop 4) is selected from the vertical group of figures 10 which is provided on the inner part 1 and in alignment with the stop numeral "8" which is just visible. The time of exposure coordinated to this desired stop value lies in the horizontal through the stop numeral "4", that is in Fig. 1 the exposure time ½ second.

Having now described the object of my invention and the manner in which the same is to be performed and employed I declare that what

I claim and desire to secure by Letters Patent is:

1. Optical light exposure meter comprising in combination a ring provided on its front with symbols denoting the values of light intensity impinging upon the eye and consequently the eye sensitivities of one and the same operator and on its rear side a scale denoting times of exposure, a disc having on the front side a scale denoting the different plate light sensitivities and freely rotatable within said ring to adjust said light sensitivity scale to said symbols, and a grey wedge mounted in said disc bearing on its side facing the rear side of the disc a scale denoting the normal sizes of stops, the numeral which is just readable being the normal stop size corresponding to the actual light intensity and plate sensitivity, said disc having on its rear side a plurality of vertical tables each in vertical alignment with one of the numerals of the scale on the grey wedge and denoting the selected sizes of stops, the numerals in the different tables being each in horizontal alignment with one of the exposure times on the ring depending upon the adjustment of said disc, the numeral on the exposure time scale in horizontal alignment with the selected stop size in the column in vertical alignment with the normal stop size representing the exposure time corresponding to the selected stop size, the light intensity and the plate sensitivity.

2. An exposure meter as specified in claim 1, in which the grey wedge is arranged obliquely to the axis of vision in the disc to prevent a reflection of the rays of vision from the observation side of the instrument into the eye of the observer.

ALOIS LEBER.